(12) United States Patent
McCarthy et al.

(10) Patent No.: US 11,982,063 B2
(45) Date of Patent: May 14, 2024

(54) SYSTEM AND METHOD FOR LEVELLING AND GRIPPING A JACKET LEG INTO A HOLLOW FOUNDATION PILE

(71) Applicant: SAIPEM S.P.A., San Donato Milanese (IT)

(72) Inventors: Vincent George McCarthy, Milan (IT); Benjamin Lloyd Stokes, Milan (IT); Christopher James Sexton, Milan (IT)

(73) Assignee: SAIPEM S.P.A., Milan (IT)

( * ) Notice: Subject to any disclaimer, the term of this patent is extended or adjusted under 35 U.S.C. 154(b) by 206 days.

(21) Appl. No.: 17/621,027

(22) PCT Filed: Jun. 19, 2020

(86) PCT No.: PCT/IB2020/055797
§ 371 (c)(1),
(2) Date: Dec. 20, 2021

(87) PCT Pub. No.: WO2020/255073
PCT Pub. Date: Dec. 24, 2020

(65) Prior Publication Data
US 2022/0333328 A1 Oct. 20, 2022

(30) Foreign Application Priority Data
Jun. 21, 2019 (EP) .................................. 19181636

(51) Int. Cl.
*E02B 17/06* (2006.01)
*E02B 17/08* (2006.01)
(Continued)

(52) U.S. Cl.
CPC ........ *E02B 17/0809* (2013.01); *E02D 27/425* (2013.01); *E02D 27/525* (2013.01);
(Continued)

(58) Field of Classification Search
CPC .......... E02B 17/02; E02B 17/04; E02B 17/06; E02B 17/08; E02B 17/0854
(Continued)

(56) References Cited

U.S. PATENT DOCUMENTS 4,919,571 A * 4/1990 Sala ........................ E02B 17/08
405/199

FOREIGN PATENT DOCUMENTS

CN 102 787 590 A 11/2012
DE 102013110599 A1 * 3/2015
(Continued)

OTHER PUBLICATIONS

Notification Concerning Submission, Obtention or Transmittal of Priority Document for International Application No. PCT/IB2020/055797 dated Sep. 30, 2020.
(Continued)

*Primary Examiner* — Sunil Singh
(74) *Attorney, Agent, or Firm* — Neal, Gerber & Eisenberg LLP

(57) ABSTRACT

A system for levelling and gripping a jacket leg into a hollow foundation pile has a levelling assembly for adjusting the longitudinal axis of a jacket leg partially inserted in a hollow foundation pile with an actuation group arranged about the jacket leg and configured to exert a force parallel to the longitudinal axis between the upper edge of the hollow foundation pile and the jacket leg and selectively attachable to the jacket leg and recoverable for further use in another levelling assembly; and a gripping assembly for locking the jacket leg in a designated position with respect to the hollow foundation pile once leveled.

18 Claims, 5 Drawing Sheets

(51) Int. Cl.
*E02D 27/42* (2006.01)
*E02D 27/52* (2006.01)
*E02B 17/00* (2006.01)
*E02B 17/02* (2006.01)

(52) U.S. Cl.
CPC ... *E02B 17/0008* (2013.01); *E02B 2017/0073* (2013.01); *E02B 17/02* (2013.01); *E02B 17/06* (2013.01); *E02D 2600/20* (2013.01)

(58) Field of Classification Search
USPC .................................................. 405/224, 227
See application file for complete search history.

(56) References Cited

FOREIGN PATENT DOCUMENTS

| | | | |
|---|---|---|---|
| EP | 0243993 | * | 11/1987 |
| EP | 0243993 A1 | * | 11/1987 |
| EP | 2 770 112 A1 | | 8/2014 |
| EP | 2 772 587 A1 | | 9/2014 |
| KR | 101629481 | * | 8/2016 |
| KR | 101629481 B1 | * | 8/2016 |
| KR | 101785961 | * | 10/2017 |
| KR | 101785961 B1 | * | 10/2017 |
| WO | WO 2012/053892 A2 | | 4/2012 |
| WO | WO 2016/085339 A1 | | 6/2016 |

OTHER PUBLICATIONS

International Search Report and Written Opinion for International Application No. PCT/IB2020/055797 dated Oct. 23, 2020.
PCT Direct Letter attached to the International Patent Application claiming the priority of the European patent application No. 19181636.2 dated Jun. 18, 2020.

* cited by examiner

SYSTEM AND METHOD FOR LEVELLING AND GRIPPING A JACKET LEG INTO A HOLLOW FOUNDATION PILE

PRIORITY CLAIM

This application is a national stage application of PCT/IM2020/055797, filed on Jun. 19, 2020, which claims the benefit of and priority to European Patent Application No. 19181636.2 filed on Jun. 21, 2019, the entire contents of which are each incorporated by reference herein.

TECHNICAL FIELD

The present disclosure relates to a system for levelling and gripping a jacket leg into a hollow foundation pile.

In particular, the present disclosure relates to a system for levelling and gripping a jacket leg of an offshore wind turbine into a hollow foundation pile installed in a bed of a body of water.

BACKGROUND

Wind turbines usually comprises a rotor, a nacelle, a tower, a support structure and foundations.

Offshore support structures are typically jacket or floating type, chosen based on the body of water depth and soil condition of the bed of the body of water.

Jacket structure comprises a number of legs that can vary according to the offshore location or according to the wind turbine concept. For example, the jacket can be monopod, tripod, with four legs or can have other leg configurations. The foundation usually comprises hollow foundation piles inserted in the bed of the body of water.

In general, the installation of an offshore wind turbine comprises the steps of partially inserting a jacket leg into a hollow foundation pile and then grouting the jacket leg into the hollow foundation pile.

When a large number of wind turbine generators are installed at wind farm sites, the hollow foundation piles and jacket legs installation are required to be separated into two different campaigns. This means that hollow foundation piles are typically installed up to a year ahead of the jacket legs. When the jacket legs are installed into the respective hollow foundation piles, there are tight tolerance requirements on jacket leg verticality. This means that a levelling system is required on each jacket leg to adjust its verticality within the permissible limits following set-down since the tilt of the wind turbine influences the mechanical behavior and the performance of the wind turbine.

In addition to this requirement, during the grouting process there are limitations on jacket leg translation within the hollow foundation pile due to environmental loading, such as barrages or underwater currents. Said jacket leg translation, in particular the lateral movement of the jacket leg into the hollow foundation pile, causes early age of the grout during the curing process. To prevent early age cycling and lock the jacket legs vertically are necessary systems to grip the jacket legs with respect to the respective hollow foundation piles referred to as 'grippers' and are connected to the jacket legs close to the top of the hollow foundation piles.

PCT Patent Application No. WO 2016/085339 teaches to couple a jacket leg with a hollow foundation pile by mounting a first flange with the jacket leg; contacting a second flange with the foundation pile such that the second flange is supported by the hollow foundation pile; mutually positioning the first flange and the second flange such that the jacket leg may be supported by the hollow foundation pile through the first flange and the second flange; and arranging an inflatable spacing member between the first flange and second flange such that the spacing member contacts both the first flange and second flange for supporting the jacket leg through the spacing member.

As described in PCT Patent Application No. WO 2012/053892, the jacket leg is gripped into the hollow foundation pile by means of a steel ring coupled to the jacket leg and provided with a plurality of hydraulic cylinders.

European Patent No. EP 2,770,112 relates to a lifting device for an offshore platform along one support leg with several segments connected to one another to form a closed clamping chain.

Chinese Patent No. CN 102,787,590 relates to a hydraulic lifting pile guide device for an offshore jack-up platform, comprising a ring, which serves as a guide for the pile and is lifted or lowered by hydraulic cylinders. Said device has the function of centering the pile with respect to a guide, reducing the friction between pile and guide during the lifting and lowering of piles.

Although certain systems for levelling and gripping are largely employed in offshore location, the overall system, including actuators, remain permanently on the jacket leg therefore becoming sacrificial on each jacket leg after completion of the installation. Therefore, the relative costs involved and environmental reasons become relevant issues.

SUMMARY

One object of the present disclosure is to provide a system for levelling and gripping a jacket leg into a hollow foundation pile that mitigates certain of the drawbacks of certain of the prior art.

According to the present disclosure there is provided a system for levelling and gripping a jacket leg into a hollow foundation pile, the system comprising:
  a levelling assembly for adjusting the longitudinal axis of
    a jacket leg partially inserted in a hollow foundation
    pile and comprising at least one actuation group configured to be arranged about the jacket leg; each
    actuation group being configured to exert a force parallel to the longitudinal axis between the upper edge of
    the hollow foundation pile and the jacket leg and
    selectively attachable to the jacket leg and recoverable
    for further use in another levelling assembly; and
  a gripping assembly configured to be arranged about the
    jacket leg for locking the jacket leg in a designated
    position with respect to the hollow foundation pile once
    leveled by the levelling assembly, and comprising a
    plurality of wedges distributed about the jacket leg and
    configured to run along the outer surface of the jacket
    leg in a direction substantially parallel to the longitudinal axis; and a plurality of further actuators, each of
    which is mounted to the jacket leg and to the wedge,
    and is configured to insert the respective wedge in a
    clearance between the hollow foundation pile and the
    jacket leg.

In certain embodiments, in accordance with the at least one actuation group, the jacket leg is lifted and the position of the longitudinal axis is adjusted. In this way, the jacket leg can be installed with relatively high accuracy in a predefined position in a relatively easy and economical manner.

Furthermore, the actuation group is recovered after the installation and can be reused in a further system providing a relatively economical advantage.

In addition, in accordance with the plurality of wedges, the jacket leg is blocked in a predefined position with respect to the hollow foundation pile.

In particular, the system comprises a stopper bracket fixed to the outer surface of the jacket leg and extending in the radial direction for limiting the insertion of the jacket leg into the hollow foundation pile. In accordance with the stopper brackets, a limit to the penetration of the jacket leg into the hollow foundation pile is provided.

In greater detail, when the gripping assembly is not yet locking the jacket leg and the hollow foundation pile and the levelling assembly is not engaged, the stopper brackets bear on the edge of the hollow foundation pile and keep the gripping assembly at a designated or given distance from the hollow foundation pile prior to engagement.

In particular, the actuation group comprises at least an actuator, such as a hydraulic cylinder, extending in a direction substantially parallel to the longitudinal axis. In this way, the jacket leg is lifted by hydraulic power.

In particular, the levelling assembly comprises a connecting element fixed to a respective actuator and configured to retain the respective actuator in a predefined positon, in which the actuator extends in a direction substantially parallel to the longitudinal axis. In this way, each actuator can be mounted in a predefined position on the jacket leg.

In particular, the levelling assembly comprises for each actuator:
  a guiding support, which is fixed to the jacket leg and has a respective through opening;
  a jacking block guided in the guiding support; and
  a levelling bracket fixed to the jacket leg, facing the respective guiding support and configured to block the longitudinal displacement of the respective actuator; each actuator being configured to exert a force parallel to the longitudinal axis between the respective levelling bracket and the jacking block resting on the edge of the hollow foundation pile.

Such a configuration provides that each actuator is activated between the respective levelling bracket and the edge of the hollow foundation pile.

Furthermore, the levelling assembly can be installed on the jacket leg in a relatively simple manner before inserting the jacket leg into the hollow foundation pile.

In particular, the levelling assembly comprises a locking pin mechanism fixed to the levelling bracket and the connecting element comprises a rod; the locking pin mechanism being configured to selectively block the rod in a predefined position in which the rod extends in a direction substantially parallel to the longitudinal axis. In this way, each actuator can be selectively blocked in a predefined position, in which each actuator extends in a direction substantially parallel to the longitudinal axis.

In particular, the levelling assembly comprises for each rod a bar fixed to the guiding support; one end of the rod being coupled to the bar in such a way to enable the rotation of the rod around the bar. In this way, when the locking pin mechanism does not block the rod, the each actuator can rotate around the connecting bar in order to mount the actuator on the jacket leg or dismount the actuator from the jacket leg for recovering of the same and further use in another levelling assembly.

In particular, the levelling assembly comprises at least a couple of actuators mounted to the connecting element and extending in a direction substantially parallel to the longitudinal axis. In this way, the couple of actuators can be mounted on the jacket leg or dismounted from the jacket leg as a single assembly in a relatively easy and fast manner.

Moreover, the couples of actuators provide relatively more power and enable the adjustment of the jacket leg position with relatively higher accuracy.

In particular, each further actuator is selectively dismountable from the jacket leg and the respective wedge. In this way, each further actuator is recovered after the installation and can be reused in a further system providing a further relative economical advantage.

In particular, each wedge is configured to run along a respective guide extending in a direction substantially parallel to the longitudinal axis on the outer surface of the jacket leg. In this way, each wedge is forced to run on a straight path substantially parallel to the longitudinal axis to the benefit of the accuracy of the system.

In particular, the further actuator is a hydraulic cylinder extending in a direction substantially parallel to the longitudinal axis. In this way, the further actuator has a relatively high power density with limited dimensions.

In particular, the system comprises for each further actuator at least one padeye fixed to the jacket leg; and at least one second padeye fixed to the wedge; the further actuator being hinged to the at least one first padeye and to the at least one second padeye. In this way, each further actuator can be dismounted in a relatively fast and easy manner from the respective jacket leg and from the respective wedge.

In particular, the system comprises for each further actuator at least a restraining member arranged around the respective further actuator and configured to retain the respective further actuator parallel to the longitudinal axis. In this way, the displacement of each further actuator occurs in a direction substantially parallel to the longitudinal axis to the benefit of the accuracy of the system.

Another object of the present disclosure is to provide a method for levelling and gripping a jacket leg into a hollow foundation pile that mitigates certain of the drawbacks of certain of the prior art.

According to the present disclosure, there is provided a method for levelling and gripping a jacket leg into a hollow foundation pile, the method comprising:
  adjusting the direction of the longitudinal axis of the jacket leg partially inserted in the hollow foundation pile by a levelling assembly;
  inserting a plurality of wedges in a clearance between the hollow foundation pile and the jacket leg by a further actuator for each wedge; and
  dismounting at least partially the levelling assembly from the jacket leg.

Such a configuration provides that the jacket leg can be levelled and gripped into the hollow foundation pile in a predefined position in a relatively easy and economical manner.

Furthermore, each levelling assembly can be at least partially recovered after the installation of the jacket leg into the hollow foundation pile and can be reused to repeat the same method steps.

In particular, the method comprises dismounting each further actuator from the jacket leg and the respective wedge. In this way, each further actuator can be recovered in a relatively easy and fast manner to carry out the same method steps.

In particular, the method comprises running a plurality of wedges distributed about the jacket leg along a respective guide extending in a direction substantially parallel to the longitudinal axis on the outer surface of the jacket leg. In this way, each wedge is forced to run on a straight path substantially parallel to the longitudinal axis.

In particular, the method comprises mounting the levelling assembly on the jacket leg before inserting the jacket leg into the hollow foundation pile. In this way, the levelling assembly is mounted on the jacket leg in a relatively easy and economical manner above the surface of the body of water.

In particular, the dismounting of the levelling assembly from the jacket leg is performed by a Remote Operated Vehicle ("ROV"). In this way, the levelling assembly can be remotely recovered underwater.

In particular, the method comprises grouting the jacket leg into the hollow foundation pile. In this way, the jacket leg and the hollow foundation pile are fixed together in a permanent way by both gripping and grouting.

BRIEF DESCRIPTION OF THE DRAWINGS

A non-limiting embodiment of the present disclosure will be described by way of example with reference to the accompanying drawings, in which.

DETAILED DESCRIPTION

Figure 1:
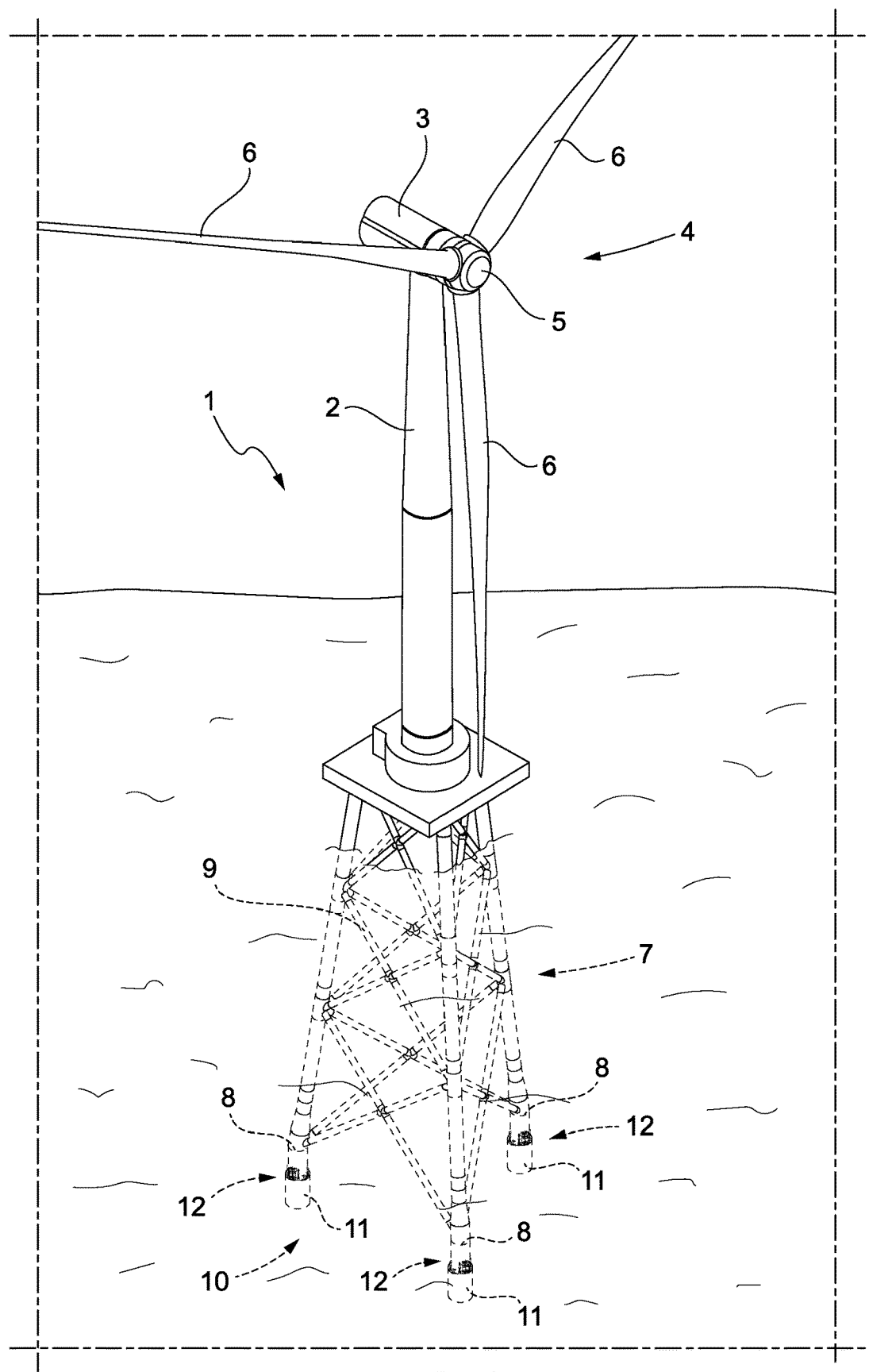
FIG. 1 is a perspective view, with parts removed for clarity, of an offshore wind turbine installed on a bed of a body of water.

Number 1 in FIG. 1 indicates an offshore wind turbine installed in an offshore site.

The offshore wind turbine 1 comprises a tower 2; a nacelle 3 rotatably mounted atop the tower 2; a rotor 4 rotatably mounted to the nacelle 3 and comprising a hub 5 and blades 6 radially extending from the hub 5; a support structure 7 which comprises jacket legs 8 and a support frame 9; and foundations 10 which comprise hollow foundation piles 11.

In the particular embodiment of FIG. 1, the support structure 7 comprises three jacket legs 8, each of which are inserted into a respective hollow foundation pile 11.

The number of jacket legs 8, the number of the hollow foundation piles 11 and the configuration of the support frame 9 can vary according to a wide range of different applications or different offshore sites (not shown in the drawings). For example, the offshore wind turbine can have one or more jacket legs and relevant hollow foundation piles.

With reference to FIG. 1, the hollow foundation piles 11 are inserted on the bed of the body of water penetrating by a depth in the bed of the body of water.

Each jacket leg 8 is partially inserted into a respective hollow foundation pile 11.

The offshore wind turbine 1 comprises a system 12 configured to level and grip each jacket leg 8 into the respective hollow foundation pile 11, mounted on each jacket leg 8 close to the edge of the respective hollow foundation pile 11.

Although in FIG. 1 the system 12 is used in an underwater environment, it should be appreciated that the system 12 can be also used over the surface of the body of water. Moreover, the system 12 can be used for onshore wind turbines and for other applications comprising the inserting and positioning of a first body into a second hollow body. Therefore, the underwater application shown in FIG. 1 is not intended as limiting the wide variety of different possible applications of the present disclosure.

Figure 2:
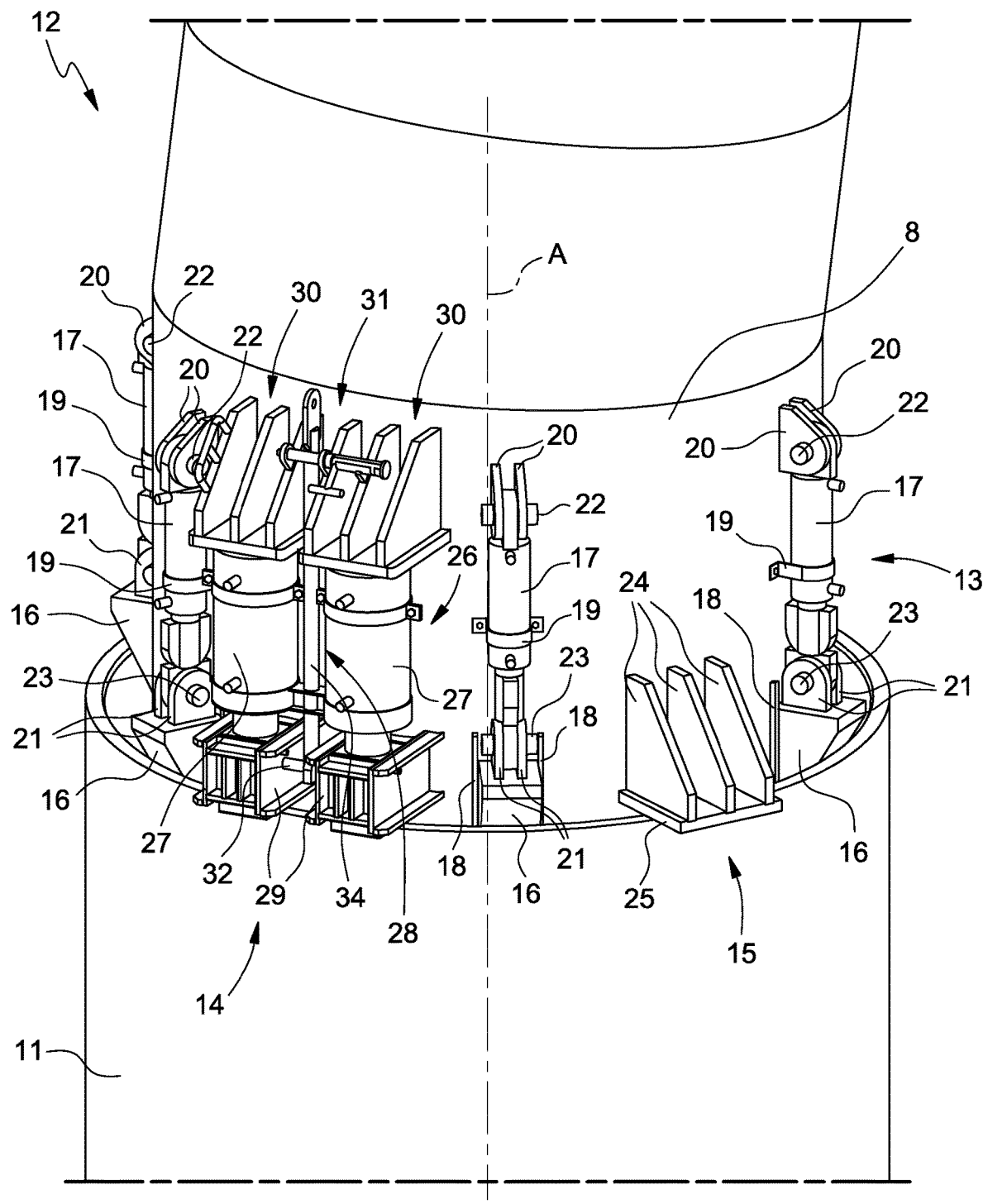
FIG. 2 is a perspective view, with parts removed for clarity, of a system for levelling and gripping a jacket leg into a hollow foundation pile of the offshore wind turbine of FIG. 1.

With reference to FIG. 2, the system 12 comprises a plurality of gripping assembly 13, a levelling assembly 14 and at least a stopper bracket 15.

The gripping assembly 13 comprises a plurality of wedges 16 distributed about each jacket leg 8 and configured to run along the outer surface of the jacket leg 8 in a direction substantially parallel to the longitudinal axis A of the jacket leg 8; one actuator 17 for each wedge 16, which is mounted to the jacket leg 8 and to the wedge 16, is configured to insert the respective wedge 16 in the clearance between the hollow foundation pile 11 and the jacket leg 8, and is selectively dismountable from the jacket leg 8 and the respective wedge 16.

The actuator 17 is a hydraulic cylinder extending in a direction substantially parallel to the longitudinal axis A. According to alternative embodiment of the present disclosure (not shown in the drawings), the actuator 17 can be of different types, such as hydraulic or electro-mechanical or pneumatic type.

The gripping assembly 13 further comprises a guide for each wedge 16 comprising a couple of ribs 18 fixed on the outer surface of the jacket leg 8 and extending in a direction substantially parallel to the longitudinal axis A; and a restraining member 19 for each actuator 17 arranged around the respective actuator 17 and configured to retain the respective actuator 17 to the jacket leg 8.

Moreover, the gripping assembly 13 comprises for each actuator 17 at least one padeye 20 fixed to the jacket leg 8 and at least one padeye 21 fixed to the wedge 16.

In particular, the gripping assembly 13 comprises for each actuator 17 a couple of padeye 20 and a couple of padeye 21. Each actuator 17 is hinged to the padeye 20 and 21 by respective pins 22 and 23.

Each stopper bracket 15 is fixed to the outer surface of the jacket leg 8 and extending in the radial direction for a length greater than the clearance between the hollow foundation pile 11 and the jacket leg 8 in order to limit the insertion of the jacket leg 8 into the hollow foundation pile 11 to keep the wedges 16 at designated distance from the hollow foundation pile 11. Said distance being shorter than the stroke of the actuator 17 in the axial direction.

In particular, each stopper bracket 15 is welded to the jacket leg 8 and comprises at least one longitudinal wall 24 extending in a direction substantially parallel to the longitudinal axis A, and a base wall 25 having a radial dimension relatively much greater than the clearance between the hollow foundation pile 11 and the jacket leg 8 and configured to bear on the edge of the hollow foundation pile 11.

The levelling assembly 14 is configured to adjust the longitudinal axis A of the jacket leg 8 partially inserted in the hollow foundation pile 11 prior to inserting the wedges 16 into the clearance between the jacket leg 8 and the hollow foundation pile 11.

The levelling assembly 14 comprises at least one actuation group 26 arranged about the jacket leg 8.

In the embodiment of FIG. 2, not limiting the present disclosure, the actuation group 26 comprises at least one actuator 27 extending in a direction substantially parallel to the longitudinal axis A.

In greater detail, each actuation group 26 comprises a couple of actuators 27 coupled together.

The actuator 27 is a hydraulic cylinder extending in a direction substantially parallel to the longitudinal axis A. According to alternative embodiment of the present disclosure (not shown in the drawings), the actuation group 26 can comprise a different number of actuators or different types of actuator, for example of electro-mechanical actuators or pneumatic actuators.

The levelling assembly 14 further comprises a connecting element 28 for each couple of actuators 27 configured to retain each actuator 27 in a predefined positon and to fix together the two actuators 27 of the couple of actuators 27; a couple of guiding supports 29 for each couple of actuators 27 fixed to the jacket leg 8; a couple of levelling brackets 30 for each couple of actuators 27 fixed to the jacket leg 8; and a locking pin mechanism 31 fixed to each couple of levelling brackets 30.

Figure 3:
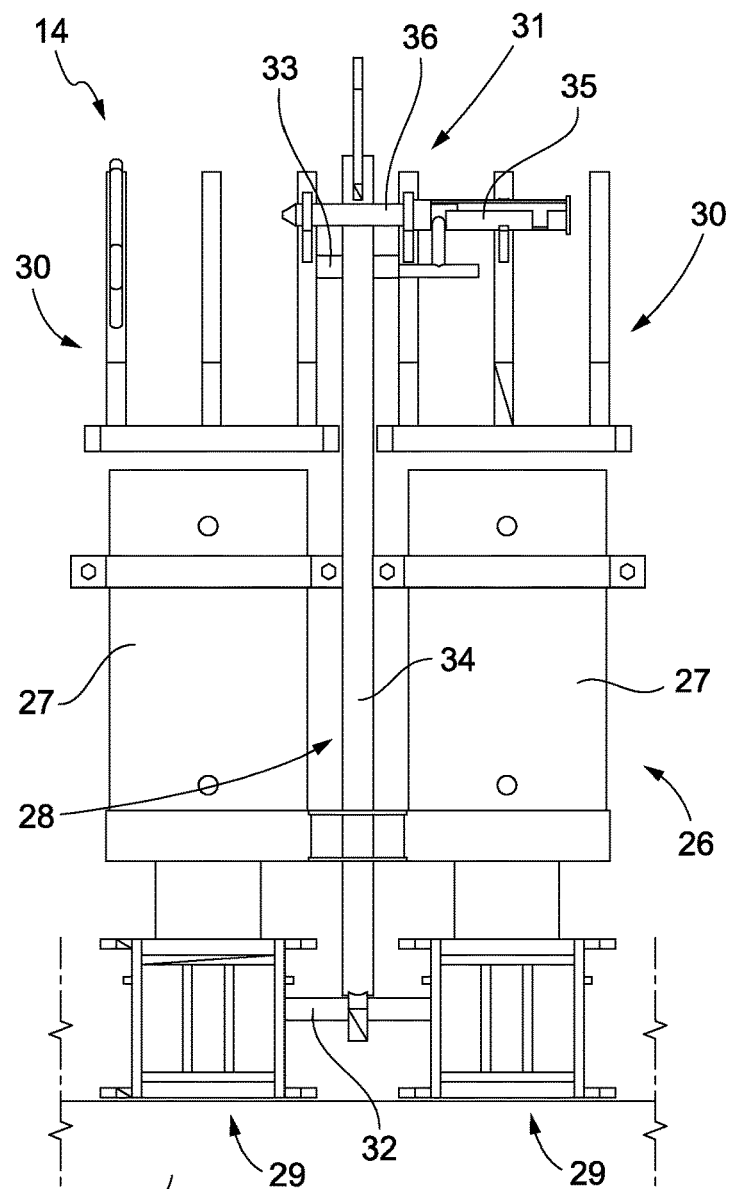
FIG. 3 is a frontal elevation view, with parts removed for clarity, of a levelling assembly of the system of FIG. 2.

With reference to FIG. 3, the guiding supports 29 of the couple of guiding supports 29 are welded to the jacket leg 8, have a through opening and are connected by a bar 32 extending in a direction transversal to the longitudinal axis A.

The levelling brackets 30 of the couple of the levelling brackets 30 are welded to the jacket leg 8 and are connected by bar 33 extending in a direction transversal to the longitudinal axis A.

The connecting element 28 comprises a rod 34 placed between the two actuators 27 of each couple of actuators 27. One end of the rod 34 is fork shaped and is coupled to the connecting bar 32 in such a way to enable the rotation of the rod 34 around the connecting bar 32.

The locking pin mechanism 31 comprises a guiding cylinder 35 and a sliding pin 36 configured to slide inside the guiding cylinder 35 in order to selectively block the rod 34 in a predefined position, in which the rod 34 is bounded in radial direction between the sliding pin 36 and the bar 33 extending in a direction substantially parallel to the longitudinal axis A.

Figure 4:
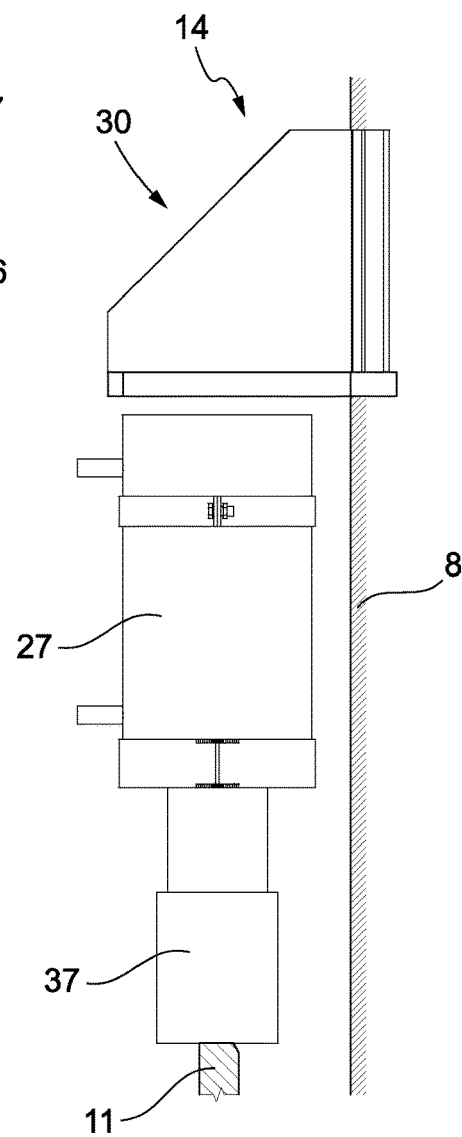
FIG. 4 is a lateral elevation view, with parts removed for clarity, of the levelling system of FIG. 3 in a particular operational configuration.

With reference to FIG. 4, each actuator 27 comprises a jacking block 37 in the lower end, which is configured to bear on the edge of the hollow foundation pile 11, passing through the through opening of the guiding support 29.

In an alternative embodiment of the present disclosure (not shown in the drawings), each guiding support 29 is not welded to the jacket leg 8 but is fixed to the respective jacking block 37 and is configured to bear on the edge of the hollow foundation pile 11.

Figure 5:
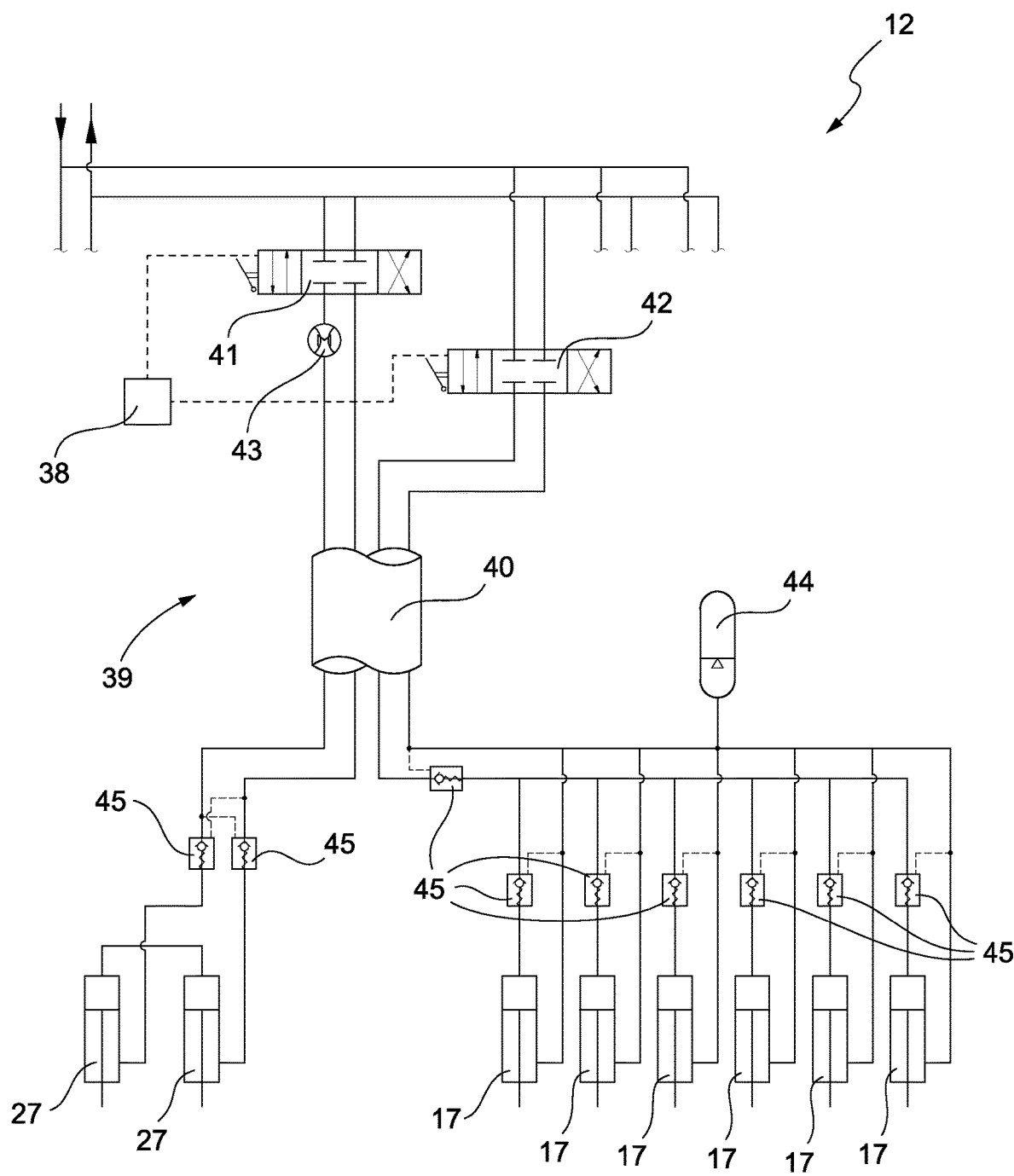
FIG. 5 is a scheme, with parts removed for clarity, of the system of FIG. 2.

With reference to FIG. 5, the system 12 comprises a control panel 38; a hydraulic circuit 39 configured to supply fluid to the actuators 17 and 27; and an umbilical 40 within which are contained the flow lines of the hydraulic circuit 39.

The hydraulic circuit 39 comprising a control valve 41 configured to selectively control the actuators 27; a control valve 42 in parallel with respect to the control valve 41 and configured to selectively control the actuators 17; and a flowmeter 43 placed on actuators 27 flow line, in order to measure the flow rate of fluid flowing into the hydraulic circuit 39 configured to provide a feedback to the control panel 38.

The hydraulic circuit 39 further comprises an accumulator 44 in fluidic communication with the actuators 17 flow line, and an actuated check valve 45 for each actuator 17 or 27.

In particular, the control panel 38 is configured to control and adjust the tilt of the longitudinal axis A and the clearance between the hollow foundation pile 11 and the jacket leg 8.

It is sufficient only one control panel 38 for each offshore wind turbine 1 since a single control panel 38 can control the correct positioning of all longitudinal axis A of each jacket leg 8 of the offshore wind turbine 1.

Figure 6B:
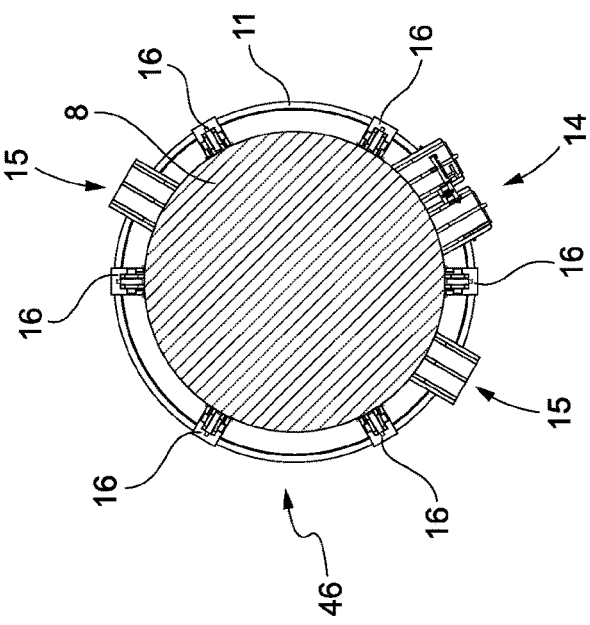
FIGS. 6A, 6B and 6C are is a section views, with parts removed for clarity and parts in cross-section along a horizontal plane, of the offshore wind turbine of FIG. 1.
Figure 6C:
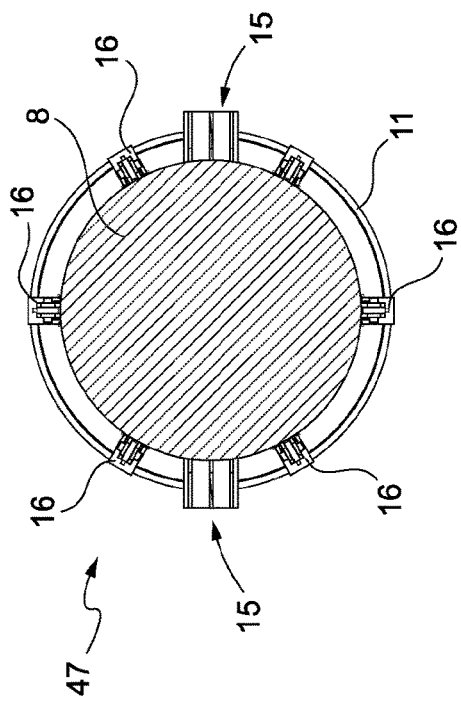
Figure 6A:
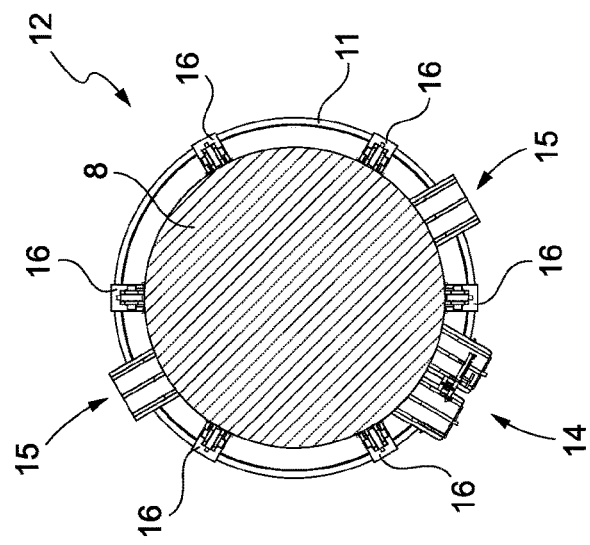

With reference to FIGS. 6A to 6C, the offshore wind turbine 1 comprises three hollow foundation piles 11, three jacket legs 8 partially inserted in the respective hollow foundation pile 11, and three systems 12 (as seen in FIG. 6A), 46 (as seen in FIG. 6B) and 47 (as seen in FIG. 6C) mounted on the respective jacket leg 8.

With reference to FIGS. 6A and 6B, the systems 12 and 46 comprises one levelling assembly 14, six wedges 16 spaced equidistantly from one another on a circular pattern around the jacket leg 8, and two stopper brackets 15 fixed on opposite sides of the jacket leg 8.

The system 47 does not comprise the levelling assembly 14 since the levelling assemblies 14 of the systems 12 and 46 are sufficient to the correct positioning of the three jacket legs 8 into the respective hollow foundation pile 11.

In particular, the levelling assembly 14 is not mounted on the higher jacket leg 8, which is statically supported by the stopper brackets 15 while the other two jacket legs 8 can be lifted by the respective levelling assembly 14.

In use and with reference to FIG. 2, before the jacket leg 8 is partially inserted into the hollow foundation pile 11, the system 12 is mounted on the jacket leg 8 prior to the installation at the final offshore or onshore site.

Once that the jacket leg 8 is partially inserted into the hollow foundation pile 11 and before the activation of the levelling assembly 14, the at least one stopper bracket 15 rests on the edge of the hollow foundation pile 11, bearing the weight of the jacket leg 8.

The actuators 27 are then activated, setting a distance in the longitudinal direction between the edge of the hollow foundation pile 11 and the at least one stopper bracket 15.

In greater detail, the upper end of each actuator 27 bear on the respective levelling bracket 30 and the jacking block 37 (FIG. 4) bear on the edge of the hollow foundation pile 11.

The control panel 38 distributes the power among the actuators 27 controlling the displacement of each actuator 27 to adjust the tilt of the longitudinal axis A and the clearance between the hollow foundation pile 11 and the jacket leg 8.

Once the longitudinal axis A is in the predefined position, each wedge 16 of the plurality of wedges 16 is inserted into the clearance between the hollow foundation pile 11 and the jacket leg 8.

Figure 7:
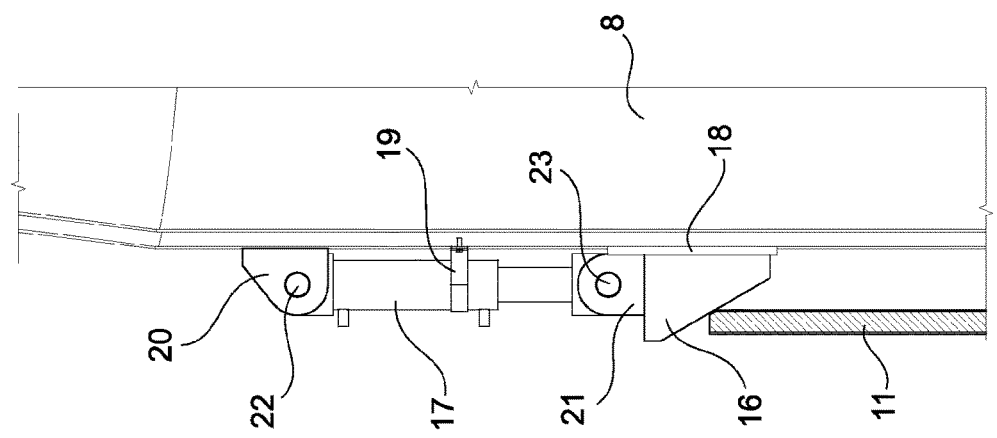
FIG. 7 is a detailed lateral elevation view, with parts removed for clarity, of the system of FIG. 2.

With reference to FIG. 7, each actuator 17 pushes the respective wedge 16, which slides on the jacket leg 8 outer surface following the respective ribs 18, into the clearance between the hollow foundation pile 11 and the jacket leg 8, blocking the lateral and the vertical movement of the jacket leg 8 with respect to the hollow foundation pile 11.

In particular, the edge of the hollow foundation pile 11 has a chamfer to enable the insertion of the wedges 16.

Once the wedges 16 are inserted into the clearance between the hollow foundation pile 11 and the jacket leg 8, the control panel 38 controls the position of the longitudinal axis A and if necessary commands the displacement of the actuators 27 to re-adjust the position of the longitudinal axis A.

In the case of re-adjustment of the longitudinal axis A position, the wedges 16 are pressed again in the clearance between the hollow foundation pile 11 and the jacket leg 8.

Once the jacket leg 8 is blocked in the predefined position by the wedges 16, the jacket leg 8 is grouted to the hollow foundation pile 11, filling with grout the clearance between the hollow foundation pile 11 and the jacket leg 8.

The actuators 27 are then removed from the jacket leg 8 for being re-used in a further system 12.

In a particular embodiment of the present disclosure, the actuators 17 are also removed from the jacket leg 8 for being re-used in a further system 12.

In a further particular embodiment of the present disclosure, the actuators 17 and 27 are maintained in position until the grout is cured.

In certain embodiments not limiting the present disclosure, the actuators 17 and 27 are removed from the jacked leg 8 by a ROV (not shown in the drawings), for being re-used in a further system 12. It should be appreciated that a ROV includes a vehicle remotely operated by a human interface eventually operated by human or software, to perform underwater operations of different kinds.

With reference to FIG. 3, for the removal of the actuators 27, each actuator 27 is retracted, releasing the loads exerted against the respective levelling bracket 30 and the edge of the hollow foundation pile 11.

Then, the sliding pin 36 slides inside the guiding cylinder 35 to unblock the radial movement of the rod 34 and to enable or allow the removal of the couple of actuators 27.

It should be appreciated that the terminology used herein is for the purpose of describing particular aspects only and is not intended to be limiting of the disclosure. For example, the singular forms "a", "an" and "the" are intended to include the plural forms as well, unless the context clearly indicates otherwise. In another example, the terms "including" and "comprising" and variations thereof, when used in this specification, specify the presence of stated features, steps, operations, elements, and/or components, but do not preclude the presence or addition of one or more other features, steps, operations, elements, components, and/or groups thereof. Additionally, a listing of items does not imply that any or all of the items are mutually exclusive nor does a listing of items imply that any or all of the items are collectively exhaustive of anything or in a particular order, unless expressly specified otherwise. Moreover, as used herein, the term "and/or" includes any and all combinations of one or more of the associated listed items. It should be further appreciated that headings of sections provided in this document and the title are for convenience only, and are not to be taken as limiting the disclosure in any way.

It is clear that the present disclosure includes variations that are not specifically described and fall within the scope of the protection of the following claims. That is, the present disclosure also covers embodiments that are not described in the detailed description above as well as equivalent embodiments that are part of the scope of protection set forth in the claims. Accordingly, various changes and modifications to the presently disclosed embodiments will be apparent to those skilled in the art.

The invention claimed is:

1. A system comprising:
    a levelling assembly configured to adjust a jacket leg when the jacket leg is partially inserted into a hollow foundation pile, the levelling assembly comprising an actuation group arrangeable about the jacket leg and configured to exert a force parallel to a longitudinal axis of the jacket leg between an upper edge of the hollow foundation pile and the jacket leg, the actuation group being selectively attachable to the jacket leg and recoverable from the jacket leg; and
    a gripping assembly arrangeable about the jacket leg and configured to lock the jacket leg in a position with respect to the hollow foundation pile responsive to the jacket leg being leveled by the levelling assembly, the gripping assembly comprising:
        a plurality of wedges distributable about the jacket leg along an outer surface of the jacket leg in a direction substantially parallel to the longitudinal axis of the jacket leg, and
        a plurality of actuators, each of the plurality of actuators being mountable to the jacket leg, mountable to a wedge of the plurality of wedges and configured to insert that wedge into a clearance between the hollow foundation pile and the jacket leg; and
    a stopper bracket that, when fixed to the outer surface of the jacket leg, extends in a radial direction and is configured to limit the insertion of the jacket leg into the hollow foundation pile.

2. The system of claim 1, wherein each actuator of the plurality of actuators of the gripping assembly is selectively dismountable from the jacket leg and the respective wedge.

3. The system of claim 1, wherein each wedge is configured to run along a respective guide extending on the outer surface of the jacket leg in a direction substantially parallel to the longitudinal axis.

4. The system of claim 1, wherein at least one actuator of the plurality of actuators of the gripping assembly comprises a hydraulic cylinder extending in the direction substantially parallel to the longitudinal axis.

5. The system of claim 1, further comprising, for each actuator of the plurality of actuators of the gripping assembly, a first padeye fixed to the jacket leg and a second padeye fixed to the wedge, wherein that actuator is hinged to the first padeye and to the second padeye.

6. A method of levelling and gripping a jacket leg extending along a longitudinal axis, the method comprising:
    limiting, by a stopper bracket that, when fixed to an outer surface of the jacket leg, extends in a radial direction, an insertion of the jacket leg into a hollow foundation pile;
    adjusting, by a levelling assembly, a direction of the longitudinal axis of the jacket leg when the jacket leg is partially inserted into the hollow foundation pile;
    for each of a plurality of wedges, inserting, by an actuator for that wedge, that wedge into a clearance between the hollow foundation pile and the jacket leg; and
    at least partially dismounting the levelling assembly from the jacket leg.

7. The method of claim 6, further comprising dismounting each actuator from the jacket leg and from the respective wedge.

8. The method of claim 6, further comprising running the plurality of wedges distributed about the jacket leg along a respective guide extending in a direction substantially parallel to the longitudinal axis on the outer surface of the jacket leg.

9. The method of claim 6, further comprising mounting the levelling assembly on the jacket leg before inserting the jacket leg into the hollow foundation pile.

10. The method of claim 6, wherein the at least partially dismounting of the levelling assembly from the jacket leg is performed by a remote operated vehicle.

11. The method of claim 6, further comprising grouting the jacket leg into the hollow foundation pile.

12. A system comprising:
a levelling assembly configured to adjust a jacket leg when the jacket leg is partially inserted into a hollow foundation pile, the levelling assembly comprising:
an actuation group arrangeable about the jacket leg and configured to exert a force parallel to a longitudinal axis of the jacket leg between an upper edge of the hollow foundation pile and the jacket leg, wherein the actuation group is selectively attachable to the jacket leg and recoverable from the jacket leg, and the actuation group comprises an actuator extending in a direction substantially parallel to the longitudinal axis,
a guiding support which is fixed to the jacket leg and defines a respective through opening,
a jacking block guided in the guiding support, and
a levelling bracket fixed to the jacket leg and facing the guiding support, the levelling bracket configured to block a longitudinal displacement of the actuator, wherein the actuator is configured to exert a force parallel to the longitudinal axis between the leveling bracket and the jacking block resting on an edge of the hollow foundation pile; and
a gripping assembly arrangeable about the jacket leg and configured to lock the jacket leg in a position with respect to the hollow foundation pile responsive to the jacket leg being leveled by the levelling assembly, the gripping assembly comprising:
a plurality of wedges distributable about the jacket leg along an outer surface of the jacket leg in a direction substantially parallel to the longitudinal axis of the jacket leg, and
a plurality of actuators, each of the plurality of actuators being mountable to the jacket leg, mountable to a wedge of the plurality of wedges and configured to insert that wedge into a clearance between the hollow foundation pile and the jacket leg.

13. The system of claim 12, wherein the levelling assembly comprises a connecting element fixable to the actuator and configured to retain the actuator in a predefined position in which the actuator extends in a direction substantially parallel to the longitudinal axis.

14. The system of claim 13, wherein the levelling assembly comprises at least a couple of actuators mounted to the connecting element and extending in the direction substantially parallel to the longitudinal axis.

15. The system of claim 12, wherein:
the levelling assembly comprises a rode and a locking pin mechanism fixable to the levelling bracket, and
the locking pin mechanism is configured to selectively block the rod in a predefined position in which the rod extends in the direction substantially parallel to the longitudinal axis.

16. The system of claim 15, wherein the levelling assembly comprises a bar fixed to the guiding support, one end of the rod being coupled to the bar to enable a rotation of the rod around the bar.

17. A system comprising:
a levelling assembly configured to adjust a jacket leg when the jacket leg is partially inserted into a hollow foundation pile, the levelling assembly comprising an actuation group arrangeable about the jacket leg and configured to exert a force parallel to a longitudinal axis of the jacket leg between an upper edge of the hollow foundation pile and the jacket leg, the actuation group being selectively attachable to the jacket leg and recoverable from the jacket leg; and
a gripping assembly arrangeable about the jacket leg and configured to lock the jacket leg in a position with respect to the hollow foundation pile responsive to the jacket leg being leveled by the levelling assembly, the gripping assembly comprising:
a plurality of wedges distributable about the jacket leg along an outer surface of the jacket leg in a direction substantially parallel to the longitudinal axis of the jacket leg, and
a plurality of actuators, each of the plurality of actuators being mountable to the jacket leg, mountable to a wedge of the plurality of wedges and configured to insert that wedge into a clearance between the hollow foundation pile and the jacket leg, and
for each actuator of the plurality of actuators of the gripping assembly, a restraining member arranged around that actuator and configured to retain the actuator parallel to the longitudinal axis.

18. A method of levelling and gripping a jacket leg extending along a longitudinal axis, the method comprising:
adjusting, by a levelling assembly, a direction of the longitudinal axis of the jacket leg when the jacket leg is partially inserted into a hollow foundation pile;
for each of a plurality of wedges, inserting, by an actuator for that wedge, that wedge into a clearance between the hollow foundation pile and the jacket leg;
retaining, by a restraining member arranged around the actuator, the actuator parallel to the longitudinal axis; and
at least partially dismounting the levelling assembly from the jacket leg.

* * * * *